(12) United States Patent
Obayashi et al.

(10) Patent No.: US 7,136,977 B2
(45) Date of Patent: Nov. 14, 2006

(54) BACKUP ACQUISITION METHOD AND DISK ARRAY APPARATUS

(75) Inventors: Junya Obayashi, Odawara (JP); Yoshitaka Kawamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 166 days.

(21) Appl. No.: 10/888,984

(22) Filed: Jul. 13, 2004

(65) Prior Publication Data

US 2005/0262316 A1 Nov. 24, 2005

(30) Foreign Application Priority Data

May 18, 2004 (JP) .............................. 2004-147962

(51) Int. Cl.
*G05F 12/16* (2006.01)

(52) U.S. Cl. ...................... 711/162; 707/204

(58) Field of Classification Search ................. 711/162
See application file for complete search history.

(56) References Cited

U.S. PATENT DOCUMENTS

| 5,163,148 | A  | * | 11/1992 | Walls ......................... 707/204 |
| 5,987,575 | A  | * | 11/1999 | Yamaguchi ................. 711/162 |
| 6,073,222 | A  |   | 6/2000  | Ohran |
| 6,269,381 | B1 | * | 7/2001  | St. Pierre et al. ........... 707/202 |
| 6,549,992 | B1 | * | 4/2003  | Armangau et al. ......... 711/162 |
| 6,651,075 | B1 | * | 11/2003 | Kusters et al. .............. 707/204 |
| 6,691,212 | B1 | * | 2/2004  | McNeil et al. .............. 711/162 |
| 6,694,413 | B1 | * | 2/2004  | Mimatsu et al. ............ 711/162 |
| 6,883,112 | B1 |   | 4/2005  | Maeda et al. |
| 6,898,688 | B1 |   | 5/2005  | Martin et al. |
| 6,901,414 | B1 | * | 5/2005  | West et al. .................. 707/201 |
| 2004/0034752 | A1 | * | 2/2004  | Ohran ........................ 711/161 |
| 2004/0186900 | A1 |   | 9/2004  | Nakano et al. |
| 2004/0268035 | A1 | * | 12/2004 | Ueno ......................... 711/112 |
| 2005/0132157 | A1 |   | 6/2005  | Maeda et al. |

FOREIGN PATENT DOCUMENTS

JP 2003280964 10/2003

* cited by examiner

*Primary Examiner*—Brian R. Peugh
*Assistant Examiner*—Matthew Bradley
(74) *Attorney, Agent, or Firm*—Antonelli, Terry, Stout and Kraus, LLP.

(57) ABSTRACT

A backup acquisition method and a disk array apparatus for implementing the method are provided for acquiring a whole or a differential backup from a disk array apparatus to a backup device. A snapshot of the contents of disks in the disk array apparatus is captured in response to a snapshot capture instruction to the disk array apparatus. Updated data is sequentially recorded after the capture of the snapshot separately into a pre-update data storage area of the disk array apparatus from the beginning. The disk array apparatus is instructed to acquire a whole or a differential backup at an arbitrary timing. The whole areas or used areas of disks in the disk array apparatus are sequentially read to acquire a whole or differential backup into the backup device.

12 Claims, 10 Drawing Sheets

| ACCESS REQUESTED LBA FROM BUSINESS SERVER | NUMBER OF UPDATED DATA STORAGE DISK DEVICE WHICH STORES DATA | LBA IN DISK DEVICE WHICH STORES UPDATED DATA |
|---|---|---|
| 1 | 13m | 0 |
| 2 | — | — |
| ⋮ | | |

1111

| ACCESS REQUESTED LBA FROM BUSINESS SERVER | LBA IN UPDATED DATA STORAGE DISK DEVICE 131 |
|---|---|
| | |
| | |
| | |
| | |

111m

| ACCESS REQUESTED LBA FROM BUSINESS SERVER | LBA IN UPDATED DATA STORAGE DISK DEVICE 13m |
|---|---|
| 1 | 0 |
| | |
| | |
| | |

BACKUP ACQUISITION METHOD AND DISK ARRAY APPARATUS

CROSS-REFERENCE TO RELATED APPLICATION

The present application claims priority from Japanese application JP 2004-147962 filed on May 18, 2004, the content of which is hereby incorporated by reference into this application.

BACKGROUND OF THE INVENTION

The present invention relates to a disk array apparatus which is configured to efficiently acquire a backup, and more particularly to a backup acquisition method and a disk array apparatus which can back up a disk area while sequentially reading the area without being conscious of a file system.

Generally, data recorded in a storage device must be periodically backed up using a backup device such as a magnetic tape device on the assumption that the data could be lost due to possible contingencies. Since an update to data being backed up, if made during a backup operation, can result in discrepancies in data, the data must be protected from being updated during the backup operation. However, in a system which is required to provide a high availability, it is difficult in view of the operation to stop updating data during a backup operation. Thus, for acquiring a backup, a snapshot of data, described below, is utilized to prevent the data from being updated, before the data is backed up.

Generally, a snapshot refers to an image of stored data at a certain time. Data subjected to the snapshot is called "original data." Immediately after a snapshot is captured, the snapshot and original data physically share a storage area. For updating data after the capture of the snapshot, the data before the update is recorded in a different area (pre-update data storage area) before the original data in the storage area is updated. Also, for referencing the original data, data should be always read from the storage area of the original data. On the other hand, for referencing a snapshot, data which is not updated after the capture of the snapshot is read from the storage area of the original data, and data which has been updated after the capture of the snapshot is read from a different area in which data before the update is recorded.

As described above, the snapshot and original data can be accessed as logically independent different data, so that the snapshot is not updated even when the original data is updated.

In a snapshot which is captured for making a backup, an update to data after the capture of the snapshot involves preserving the data before the update in a different area (pre-update data storage area), and then updating the original data storage area. As a result, the storage area of the snapshot will mixedly exist in the original data storage area and the pre-update data storage area. For referencing the snapshot, required portions must be referenced astride both the areas, disadvantageously resulting in the inability to sequentially reading a single disk area for acquiring a backup.

Also, during the acquisition of a backup, frequent seek operations are required for searching the original data storage area and pre-update data storage area for a differential backup from a whole backup, disadvantageously causing an increase in the processing time and time-consuming operations.

SUMMARY OF THE INVENTION

It is therefore an object of the present invention to provide a backup acquisition method and a disk array apparatus which are capable of acquiring a backup without discrepancies in data even without causing a system to stop an update to data by capturing a snapshot before the backup is started, and are capable of backing up updated data without conducting a search.

To solve the problems mentioned above and achieve the object of the present invention, a backup acquisition method of the present invention involves capturing a snapshot of the contents of disks in the disk array apparatus in response to a snapshot capture instruction to the disk array apparatus, and sequentially recording updated data after the capture of the snapshot separately in a pre-update data storage area of the disk array apparatus from the beginning. Then, the method includes instructing the disk array apparatus to acquire a whole backup at an arbitrary timing, and sequentially reading all areas of disks in the disk array apparatus to acquire the whole backup into the backup device.

Another backup acquisition method of the present invention involves capturing a snapshot of the contents of disks in the disk array apparatus in response to a snapshot capture instruction to the disk array apparatus, and sequentially recording updated data after the capture of the snapshot separately in a pre-update data storage area of the disk array apparatus from the beginning. Then, the method includes instructing the disk array apparatus to acquire a differential backup at an arbitrary timing, and sequentially reading all areas of disks in the disk array apparatus to acquire the differential backup into the backup device.

In the present invention, after a snapshot is captured, data is updated in a physically different storage area. In this way, a storage area captured in the snapshot does not disperse, so that a backup can be acquired by sequentially reading a single disk area.

In the disk array apparatus, updated data blocks are divided for management, and a backup is sequentially made into the backup device in response to a request from a backup software. In this way, the backup can be rapidly acquired.

Also, a disk array apparatus of the present invention includes original data storing means for storing original data, updated data storing means for storing updated data, snapshot capturing means responsive to a snapshot capture instruction for capturing a snapshot of the contents of disks in the original data storing means into the updated data storing means, updated data recording means for sequentially recording updated data after the acquisition of the snapshot separately in a pre-update data storage area on a disk of the updated data storing means from the beginning, updated data reading means responsive to a whole backup acquisition instruction or a differential backup acquisition instruction to the updated data storing means for sequentially reading a whole area or a used area of a disk in the updated data storing means at an arbitrary timing, and transferring means for transferring the read updated data to the backup device such that a whole backup or a differential backup can be acquired.

The snapshot capturing means provided in the disk array apparatus permits a backup to be captured by sequentially reading data irrespective of the type of an operating system or the type of an application used in a business server connected to the disk array apparatus through a network.

According to the present invention, since a backup of a snapshot can be acquired by sequentially reading a single

BRIEF DESCRIPTION OF THE DRAWINGS

FIG. 4 includes tables showing how the index table and snapshot management tables are rewritten due to a data update after the snapshot has been captured;

DETAILED DESCRIPTION OF THE EMBODIMENTS

In the following, an exemplary embodiment of the present invention will be described in detail with reference to the accompanying drawings as required.

Figure 1:
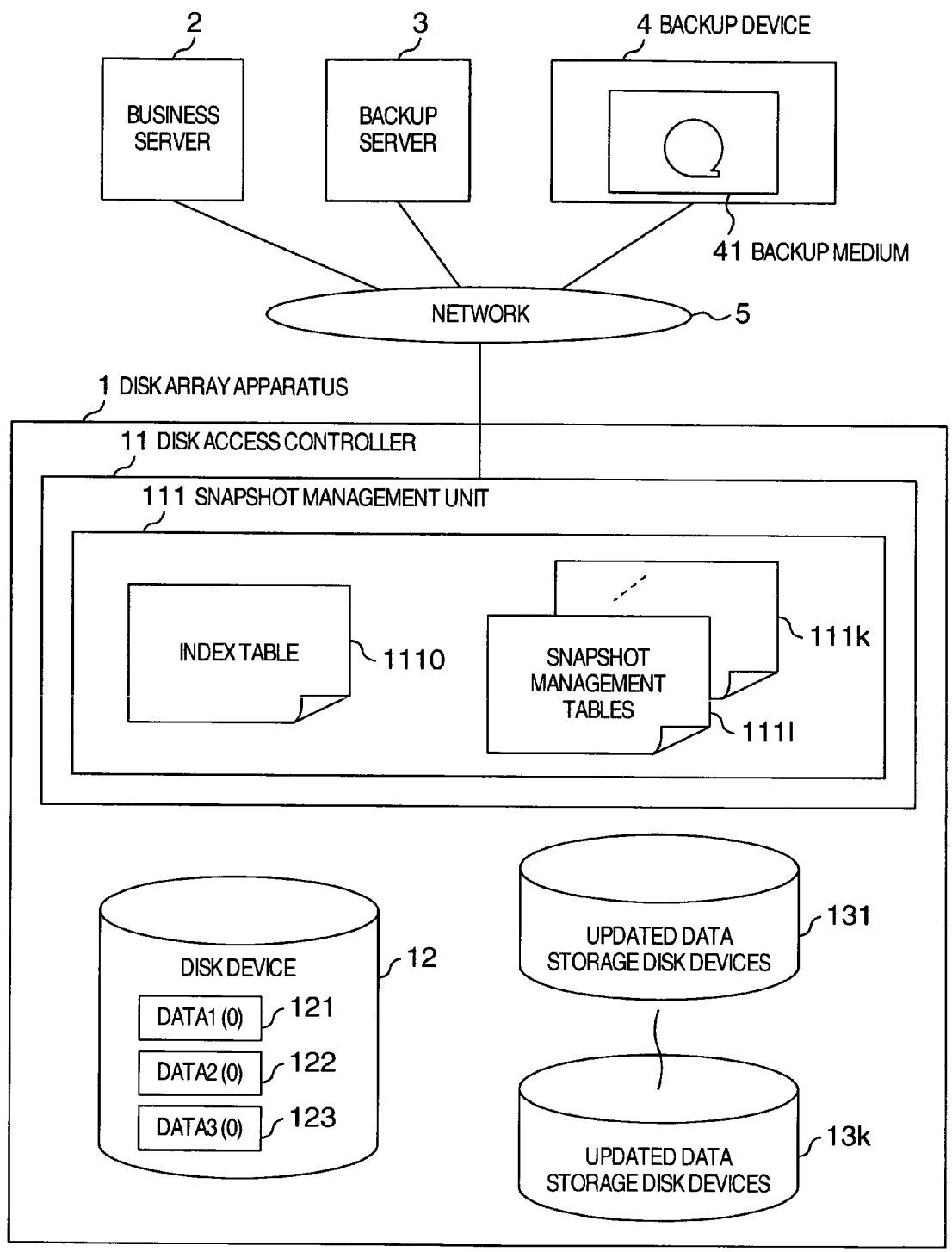
FIG. 1 is a block diagram illustrating the configuration of a storage system according to one embodiment of the present invention.

FIG. 1 is a block diagram illustrating the configuration of a storage system according to one embodiment of the present invention.

The storage system illustrated in FIG. 1 comprises a disk array apparatus 1; a business server 2; a backup server 3; a backup device 4; a network 5; a disk access controller 11; a snapshot management unit 111 which has an index table 1110 and snapshot management tables 1111-111k; a disk device 12; updated data storage disk devices 131-13k.; and a backup medium 41 contained in the backup device 4. Alternatively, the backup medium 41 may be provided external to the backup device 4.

The disk array apparatus 1 stores data processed by the business server 2 through the network 5, and backs up the stored data in the backup device 4 in association with the backup server 3. The data disk apparatus 1 comprises the disk access controller 11 for controlling data read and write; disk device 12 for storing original data; and two or more updated data storage disk devices 131-13k for storing data which are updated after a snapshot has been captured.

The disk access controller 11 has the snapshot management unit 111 which comprises the snapshot management tables 1111-111k for managing data for which a snapshot is captured; and the index table 1110 for managing index information in the snapshot management tables 1111-111k.

Here, the disk access controller 11 has a function of capturing a snapshot into the updated data storage disk devices 131-13k, which store an updated version of the contents of the disk device 12 which stores original data, in response to a snapshot capture instruction.

The disk access controller 11 also has a function of sequentially storing updated data after a snapshot separately in pre-update data storage areas of the updated data storage disk devices 131-13k from the beginning.

The disk access controller 11 further has a function of sequentially reading data from all disk areas or used disk areas of the updated data storage disk devices 131-13k at an arbitrary timing in response to a whole backup acquisition or a differential backup acquisition instruction to the updated data storage disk devices 131-13k.

The disk access controller 11 further has a function of transferring read update data to the backup device 4 such that the whole backup or differential backup can be acquired in the backup device 4.

Next, a backup acquisition method for acquiring a whole backup from the disk array apparatus 1 to the backup device 4 in the storage system configured as described above is implemented in the following procedure.

First, in response to a snapshot capture instruction to the disk array apparatus 1, the disk array apparatus 1 captures a snapshot of the disk contents. Next, the disk array apparatus 1 sequentially stores updated data after the capture of the snapshot separately in pre-update data storage areas of the updated data storage disk devices 131-13k from the beginning.

Afterward, the disk array apparatus 1 is instructed to acquire a whole backup at an arbitrary timing. In response, the disk array apparatus 1 sequentially reads all the disk areas while the backup device 4 acquires a whole backup.

A backup acquisition method for acquiring a differential backup from the disk array apparatus 1 to the backup device 4 is implemented in the following procedure.

First, in response to a snapshot capture instruction to the disk array apparatus 1, the disk array apparatus 1 captures a snapshot of the disk contents. Next, the disk array apparatus 1 sequentially stores updated data after the capture of the snapshot separately in pre-update data storage areas of the updated data storage disk devices 131-13k from the beginning.

Afterward, the disk array apparatus 1 is instructed to acquire a differential backup at an arbitrary timing. In response, the disk array apparatus 1 sequentially reads used areas of the disks, while the backup device 4 acquires a differential backup.

Here, the snapshot capture instruction to the disk array apparatus 1 is a general snapshot capture instruction to the disk array apparatus 1.

Also, the pre-update data storage areas are different from the original data storage area, or are defined on disks different from an original data storage disk.

The timing at which the disk array apparatus 1 is instructed to acquire a differential backup is determined in accordance with the time, number of times, or storage capacity. For example, the whole backup may be taken every week, while the differential backup may be taken everyday. Alternatively, the differential backup may be taken when the pre-update data areas are filled up.

By repeatedly capturing snapshots, used areas of the disks in the disk array apparatus 1 are sequentially read, while the backup device 4 repeatedly acquires differential backups.

The disk array apparatus 1 also has the snapshot management table 1111-111k, and index table 1110 for managing captured snapshots.

The disk array apparatus 1 restores data based on backup data from the backup device 4. These may be determined based on the operation illustrated in FIG. 12, later described, or the contents of updated disks may be reflected to the disk array apparatus 1 by instructions from a higher level system.

Also, a whole backup may be acquired from the disk array apparatus 1 to the backup device 4 at the first backup operation, and a differential backup may be acquired at the second backup operation or later.

Further, the snapshot management tables 1111 -111k and index table 1110 held by the disk array apparatus 1 may be used as management information for managing the capture of snapshots, such that the backup device 4 may further acquire another backup on an external tape recording device, not shown in FIG. 4.

Next, description will be made on the operation of the disk array apparatus before a snapshot is captured in the storage system configured as described above in accordance with the present invention.

Data handled by the business server 2 is stored in the disk device 12 through the disk access controller 11. A logical block address (LBA) indicative of the location from which data is stored is defined in the disk device 12, so that an access to the disk device 12 from the business server 2 is made by specifying an associated LBA.

A data size which can be stored in each block indicated by LBA is fixed, so that in the example illustrated in FIG. 1, data from the business server 2 is divided into DATA1 (0) 121-DATA3 (0) 123 which are stored in blocks LBA1–LBA3, respectively. When the business server 2 requests the disk device 12 to reference data stored in the blocks LBA1–LBA3, the disk array apparatus 1 references the blocks LBA1–LBA3 in the disk device 12 to read data stored therein, and returns the read data to the business server 2.

Next, description will be made on the operation of the disk array apparatus 1 after the capture of a snapshot in the storage system described above in accordance with the present invention.

Here, a snapshot command, for example, is issued from the business server 2 or backup server 3 to the disk array apparatus 1.

The disk array apparatus 1 can capture snapshots a plurality of times, wherein each snapshot represents the contents of the disks at the instant at which the snapshot is captured. Here, for distinguishing a plurality of snapshots from one another, the first captured snapshot is called the "first generation snapshot," and a snapshot captured at an m-th time is called the "m-th generation snapshot."

Upon receipt of an instruction to capture an m-th generation snapshot from the outside, the disk array apparatus 1 initializes a snapshot management table 111m which manages the m-th generation snapshot, and switches to an updated data storage volume 131m into which subsequent data is written. For capturing the first generation snapshot, the disk array apparatus 1 initializes the index table 1110 as well.

Figure 2:
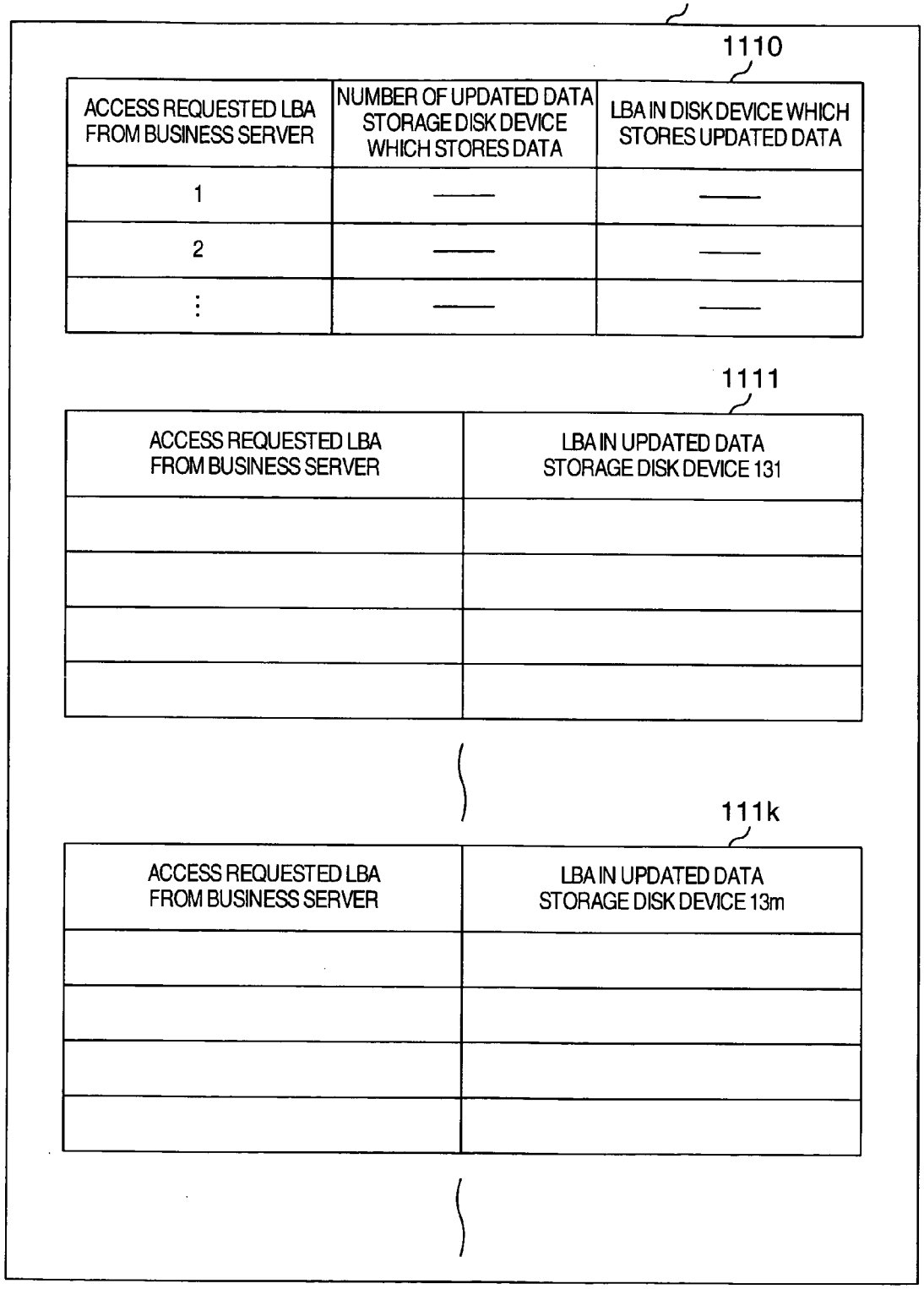
FIG. 2 include tables showing exemplary structures of an index table and snapshot management tables.

FIG. 2 shows exemplary structures of the index table 1110 and snapshot management tables 1111-111k.

In FIG. 2, the index table 1110 has rows corresponding to all LBAs in the disk device 12. Each row of the index table 1110 is given an associated LBA number of the disk device 12 in order.

Figure 3:
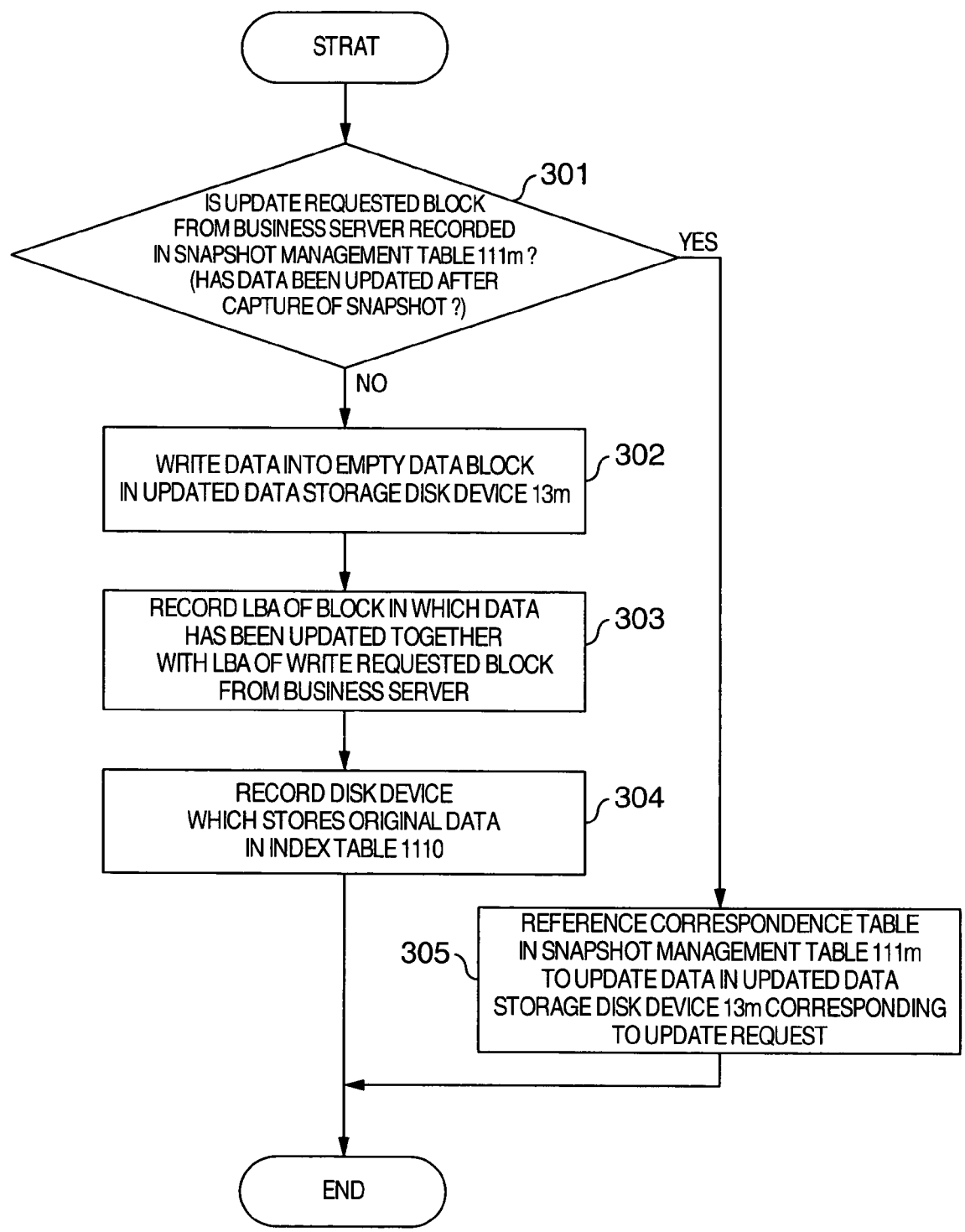
FIG. 3 is a flow chart illustrating a processing procedure for updating data after a snap shot has been captured.

A method of updating data after the m-th generation snapshot has been captured will be described with reference to a flow chart of FIG. 3.

As an example, described below is how the contents of the block LBA1 is updated from DATA1 (0) to DATA1 (1) after the capture of the m-th generation snapshot.

First, the business server 2 issues a request to the storage array apparatus 1 to update data in the block LBA1 to DATA1 (1). Upon receipt of the update request, the storage array apparatus 1 references the snapshot management table 111m to confirm whether or not the block to which an update is requested has been updated (step 301).

Next, if the update requested block has not been updated, the storage array apparatus 1 writes the data in the block LBA1 into an empty data block in an updated data storage disk device 13m. In this event, an empty block is selected in order from LBA0 (step 302).

The storage array apparatus 1 records the LBA of the update requested block in the disk device 12 from the business server 2, and the LBA of the block in the updated data storage disk device 13m into which the data has been actually written in the snapshot management table 111m and index table 1110, as shown in FIG. 4 (steps 303, 304).

As can be seen in FIG. 4, the index table 1110 has recorded that when a request is made from the business server 2 to reference the block LBA1, the block LBA0 in the updated data storage disk device 13m may be referenced. The snapshot management table 111m in turn records the correspondence of the LBA of the update requested block from the business server 2 and the LBA of the block in which data was actually updated.

Figure 5:
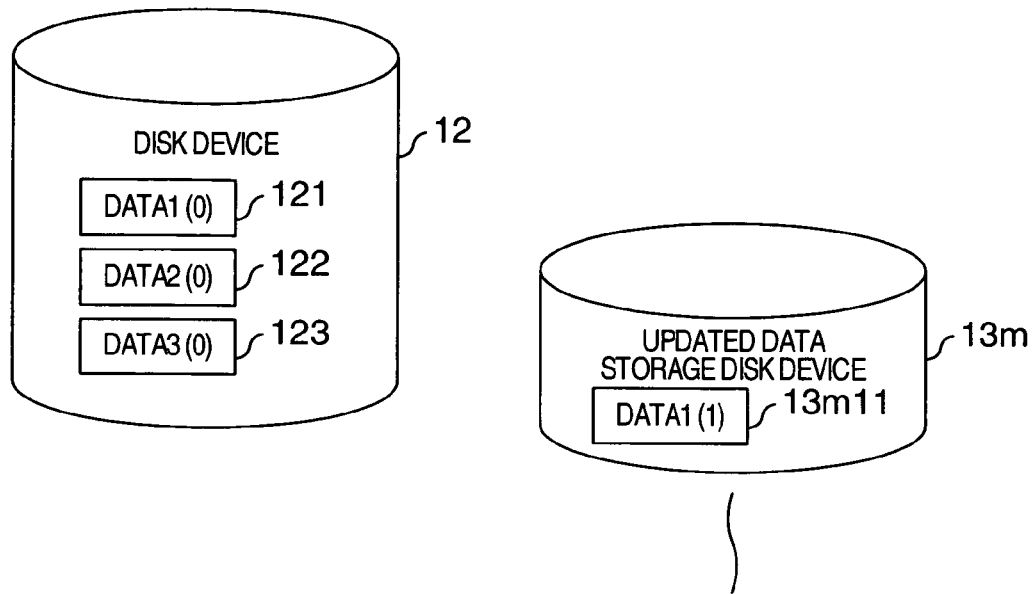
FIG. 5 is a diagram showing contents of an updated data storage disk device resulting from an update to data after the snapshot has been captured.

As a result, the contents of the disk device 12 and updated data storage disk device 13m are changed as illustrated in FIG. 5.

Next, when DATA1 (1) is again updated to DATA(2) in the illustrated state, the disk array apparatus 1 references the snapshot management table 111m to confirm whether or not the update requested block LBA1 has been updated after the capture of the m-th generation snapshot (step 301).

Since data in the update requested LBA1 has been updated after the capture of the m-th generation snapshot, the disk array apparatus 1 references the snapshot management table 111m to switch the requested block LBA1 from the business server 2 to the block LBA0 in the updated data storage disk device 13m in which data is actually updated, and updates the data in the block LBA0 (step 305).

Figure 6:
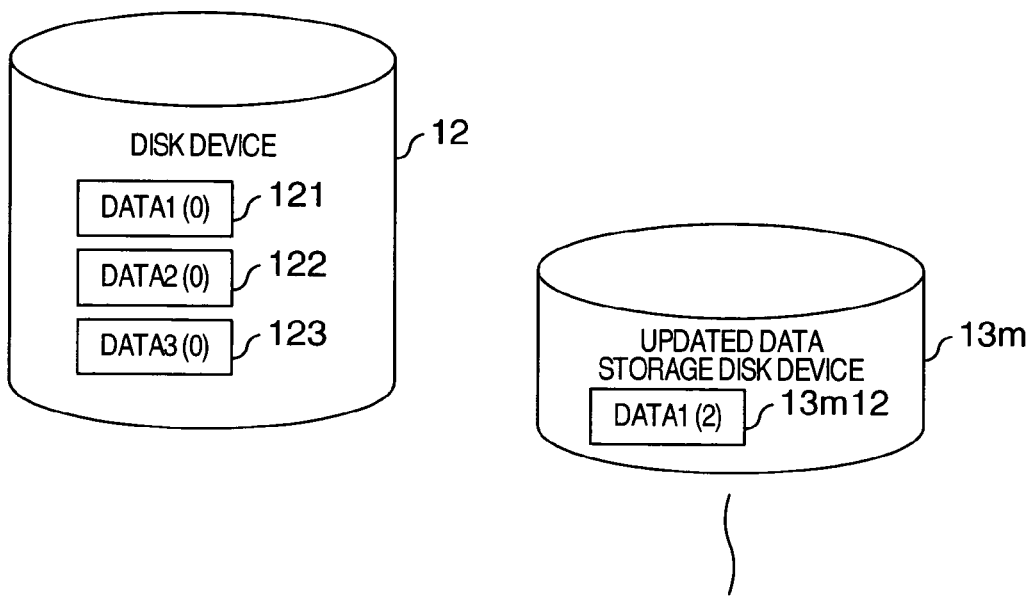
FIG. 6 is a diagram showing contents of an updated data storage disk device resulting from an update to data after the snapshot has been captured.

As a result, the contents in the disk device 12 and updated data storage disk device 13m are changed as illustrated in FIG. 6.

Figure 7:
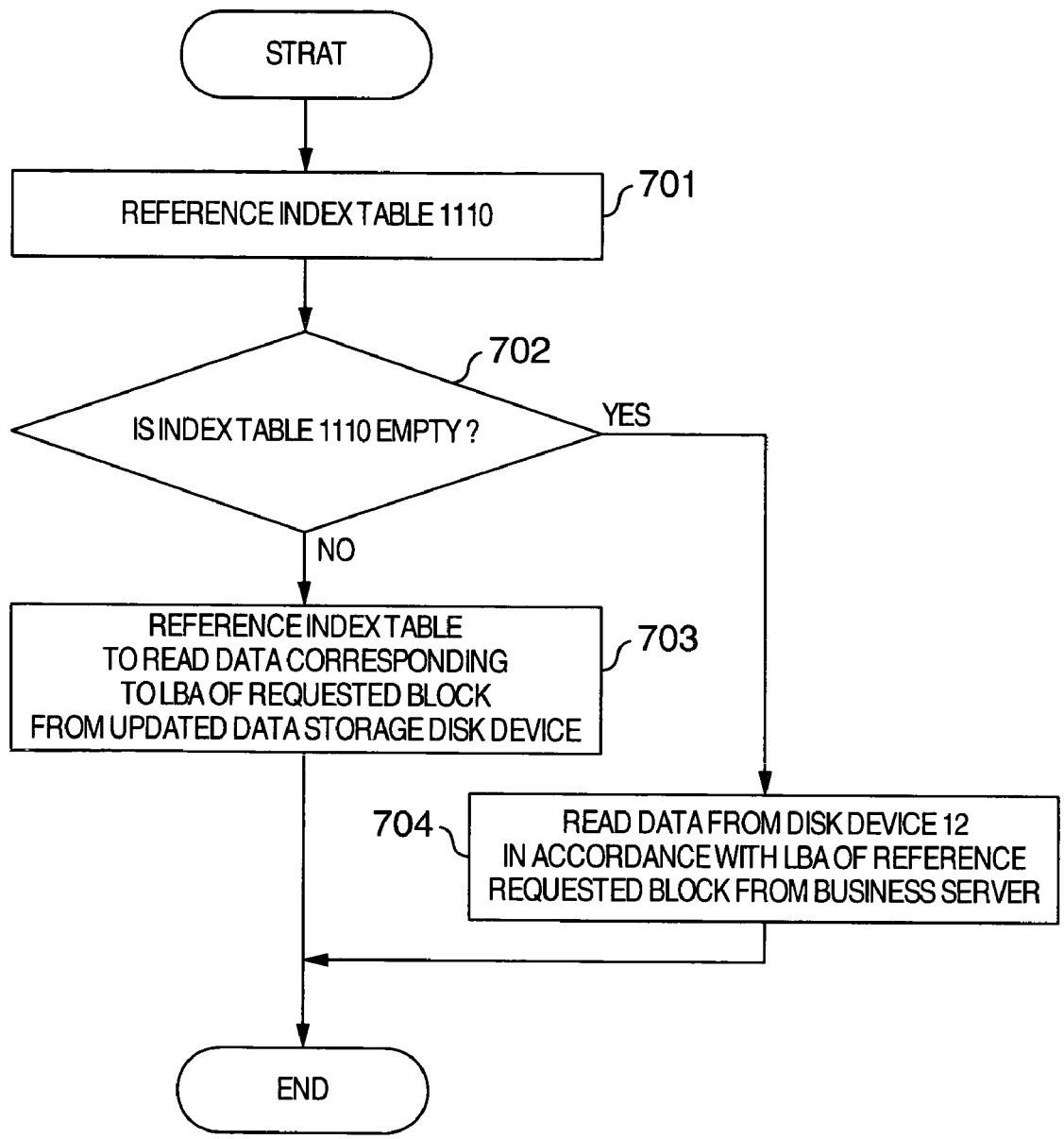
FIG. 7 is a flow chart illustrating a procedure for referencing data after a snapshot has been captured.

Next, a method of referencing data from the business server 2 in the state illustrated in FIG. 6 will be described with reference to FIG. 7. As an example, described below is how data is referenced when the business server 2 requests a reference to blocks LBA1–LBA2.

First, a request for a reference to data in the blocks LBA1, LBA2 is issued from the business server 2 to the storage array apparatus 1.

Upon receipt of the reference request, the storage array apparatus 1 confirms from the index table 1110 where the blocks LBA1, LBA2 are recorded (steps 701, 702). In this example, the storage array apparatus 1 knows from the index table 1110 that data in the reference requested block LBA1 is recorded in a block LBA0 in the updated data storage volume 13m, but data in the reference requested block LBA2 is not recorded in the updated data storage volume because of a blank cell indicative of an updated data storage disk device in which data in the block LBA2 should be recorded.

For the request to a reference to the block LBA1 from the business server 2, the disk array apparatus 1 references the index table 1110, and returns the result of a reference to the block LBA0 from the updated data storage disk device 13*m* (step 703).

For the request to a reference to the block LBA2 from the business server 2, the disk array apparatus 1 returns the result of a reference to a block BLA2 in the disk device 12 because the associated cell is blank in the index table 1110 (step 704).

Figure 8:
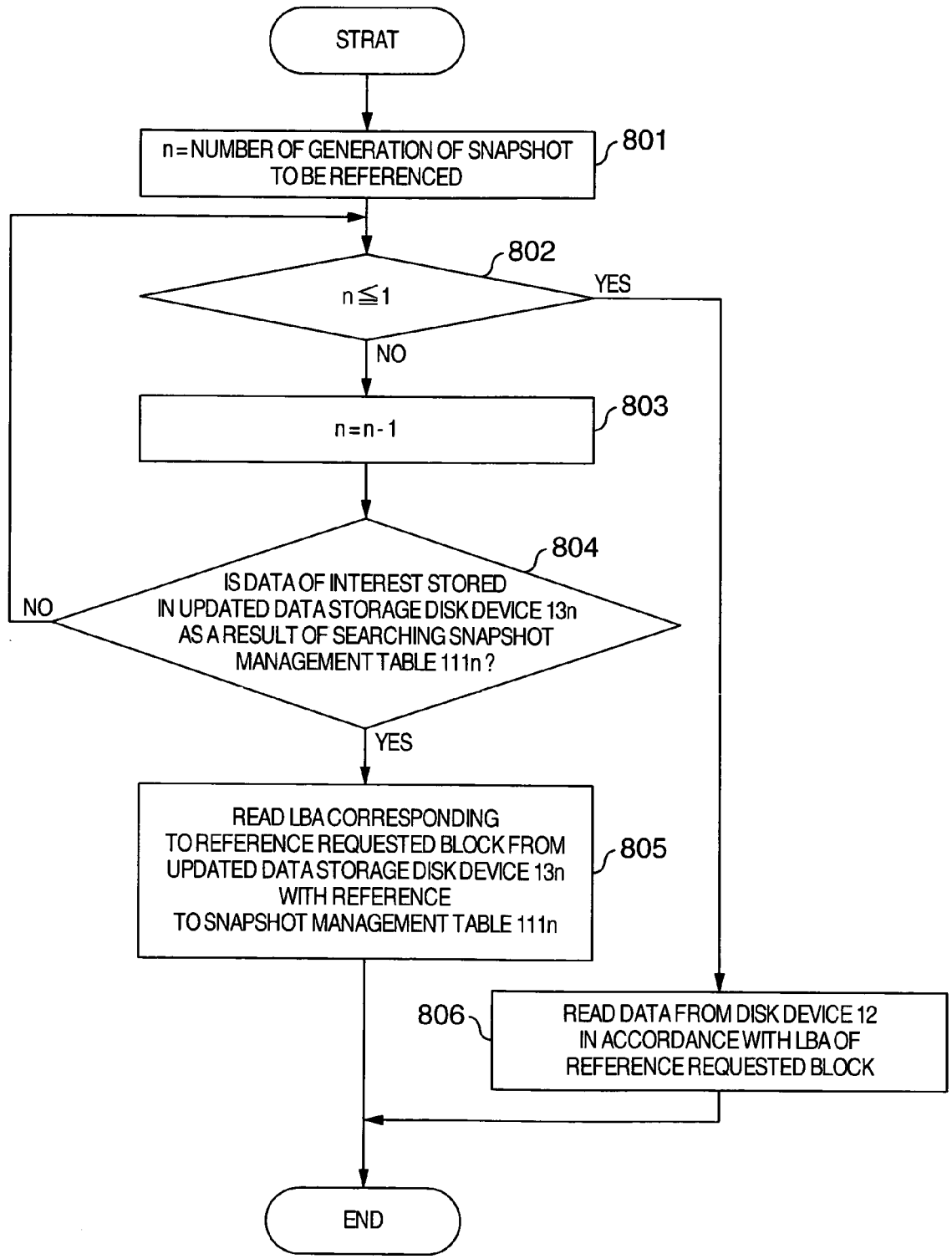
FIG. 8 is a flow chart illustrating a procedure for referencing a snapshot.

Next, a method of referencing an m-th generation snapshot will be described with reference to FIG. 8.

A reference to the m-th generation snapshot involves searching the snapshot management tables from 111 (m-1) to 1111 in order, and searching an updated data storage disk which stores a block LBA which is requested for a reference (steps 801–804).

If the LBA of a reference requested block is not recorded in any of the snapshot management tables, the reference requested block is read from the disk device 12 (step 806).

If an update record is found in the snapshot management table 111L, the reference requested block LBA is switched to a block LBA in an updated data storage disk device 13L which is actually referenced, retrieved from the snapshot management table 111L, and data is read from the updated data storage disk device 13L (step 805).

Next, a backup acquisition method will be described.

A backup is acquired by issuing a snapshot capture instruction from the backup server 3 to the disk array apparatus 1, and recording a captured snapshot on the backup medium 41 in the backup device 4.

The backup is classified into a whole backup for backing up all data in the business server 2, and an update backup for backing up updated data from the preceding backup. The whole backup facilitates the restoration of data from the backup though it takes a long time for acquisition. On the other hand, the update backup requires a shorter time for acquisition, but data cannot be restored unless data of the whole backup is available.

Bearing the foregoing in mind, in actual operations, the whole backup is first acquired, and subsequently, the update backup is acquired a required number of times. The backup is efficiently acquired by combining the whole backup with the update backup. Next, the backup acquisition method according to the present invention will be described with reference to FIG. 9.

A snapshot (first generation) is captured for acquiring a whole backup. Since an update after the capture of the first-generation snapshot is recorded in the updated data storage disk device 131, the first-generation snapshot is stored only in the disk device 12. Therefore, the whole backup is acquired by sequentially reading the overall area of the disk device 12 (step 901).

Next, a method of acquiring an update backup will be described. In the present invention, an update after the acquisition of the whole backup is recorded in the updated data storage disk device 131, an update backup is acquired taking advantage of recorded updates.

First, a snapshot (second generation) is again captured for preventing a write into the updated data storage disk device 131. Subsequent updates are made to an updated data storage disk device 132, such that no write is performed into the updated data storage disk device 131.

Then, the entire snapshot management table 1111 and the updated data storage disk device 131 are sequentially read for a backup. Since the updated data storage disk device 131 is used from a block LBA0 in order, blocks from LBA0 to the last used LBA may be backed up (step 903).

Subsequently, update backups are made a determined number of times in a similar manner (steps 902–903).

Next, for again acquiring a whole backup, the index table 1110 is once referenced to reflect the contents of the updated data storage disk devices 131-13*k* to the disk device 12 in order to sequentially make the whole backup (sep 904). Then, the whole backup is acquired by the aforementioned method (step 901).

Interactions among the backup server 3, disk array apparatus 1, and backup device 4 for implementing the steps 901, 903 in FIG. 9 will be described with reference to FIG. 10.

First, the backup server 3 issues a snapshot capture instruction to the disk array apparatus 1 (901-1). In response to the instruction, the disk array apparatus 1 captures a snapshot, and returns a completion notice to the backup server 3 (901-2).

Next, the backup server 3 instructs the backup device 4 to prepare for a backup (901-3), and upon completion of the preparation, the backup device 4 returns a preparation completion notice to the backup server 3 (901-4). As the foregoing preparation is completed, the backup server 3 issues a backup data transmission instruction to the disk array apparatus 1 (903-1).

In response to this instruction, the disk array apparatus 1 transmits backup data to the backup device 4 (903-2). Upon completion of the transmission of the backup data, the disk array apparatus 1 returns a backup data transmission completion notice to the backup server 3 (903-3). Then, finally, the backup server 3 issues a backup completion notice to the disk array apparatus 4 (903-4).

Figure 9:
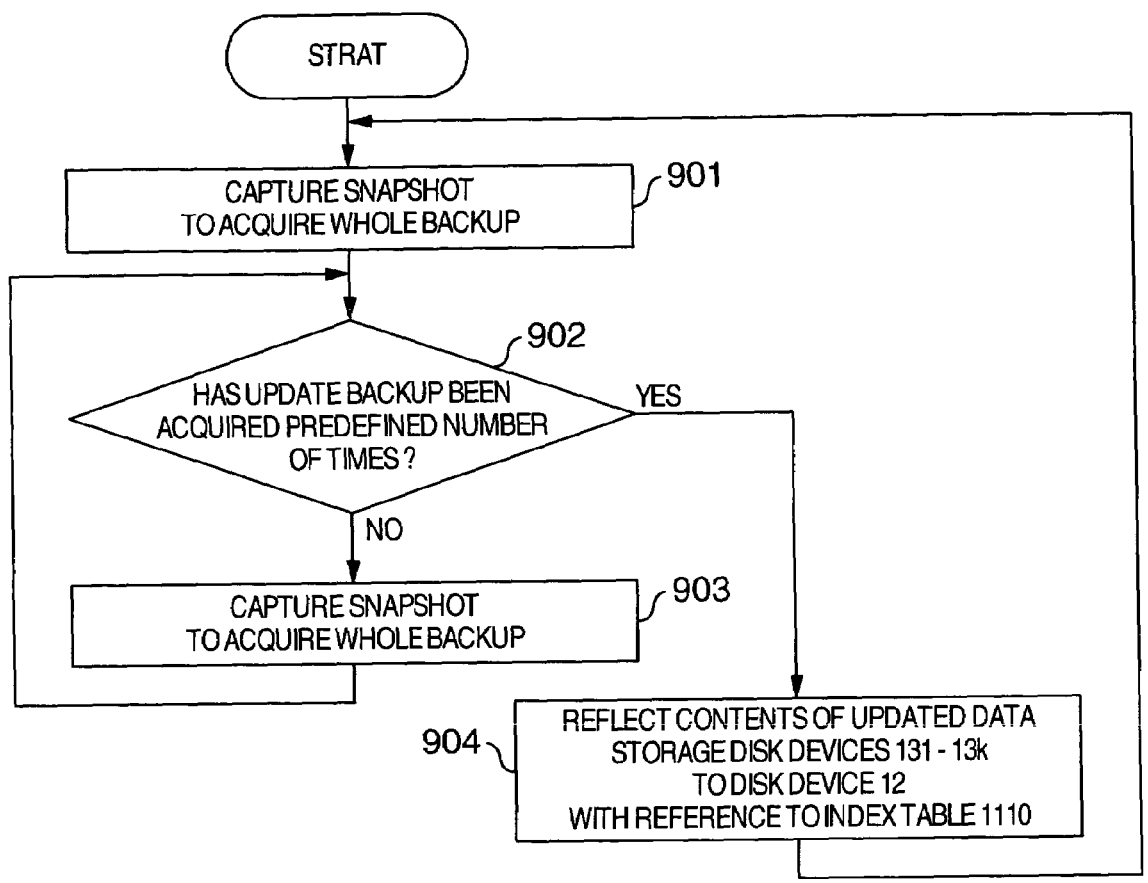
FIG. 9 is a flow chart illustrating a procedure for acquiring a backup.
Figure 11:
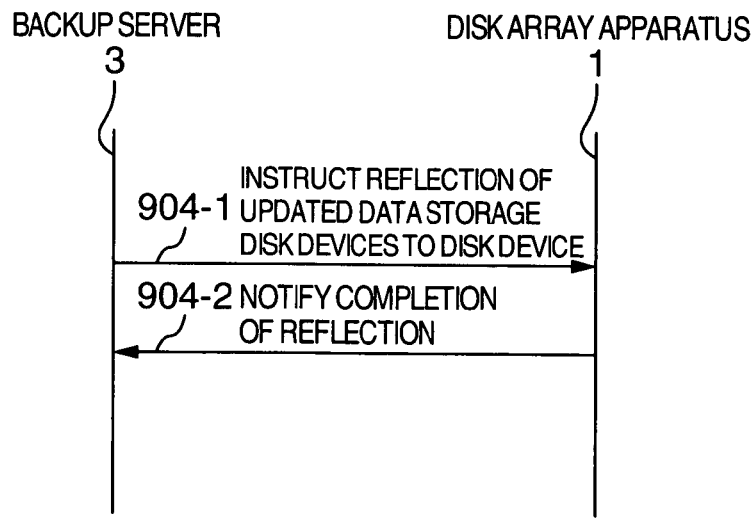
FIG. 11 is a diagram illustrating interactions between the backup server and disk array apparatus for implementing step 904 in FIG. 9.

Next, FIG. 11 illustrates interactions between the backup server 3 and disk array apparatus 1 for implementing step 904 in FIG. 9. First, the backup server 3 issues an instruction to the disk array apparatus 1 to reflect the updated data storage disks to the disk device 12 (904-1). Upon completion of the reflection, the disk array apparatus 1 returns a reflection completion notice to the backup server 3 (904-2).

Figure 10:
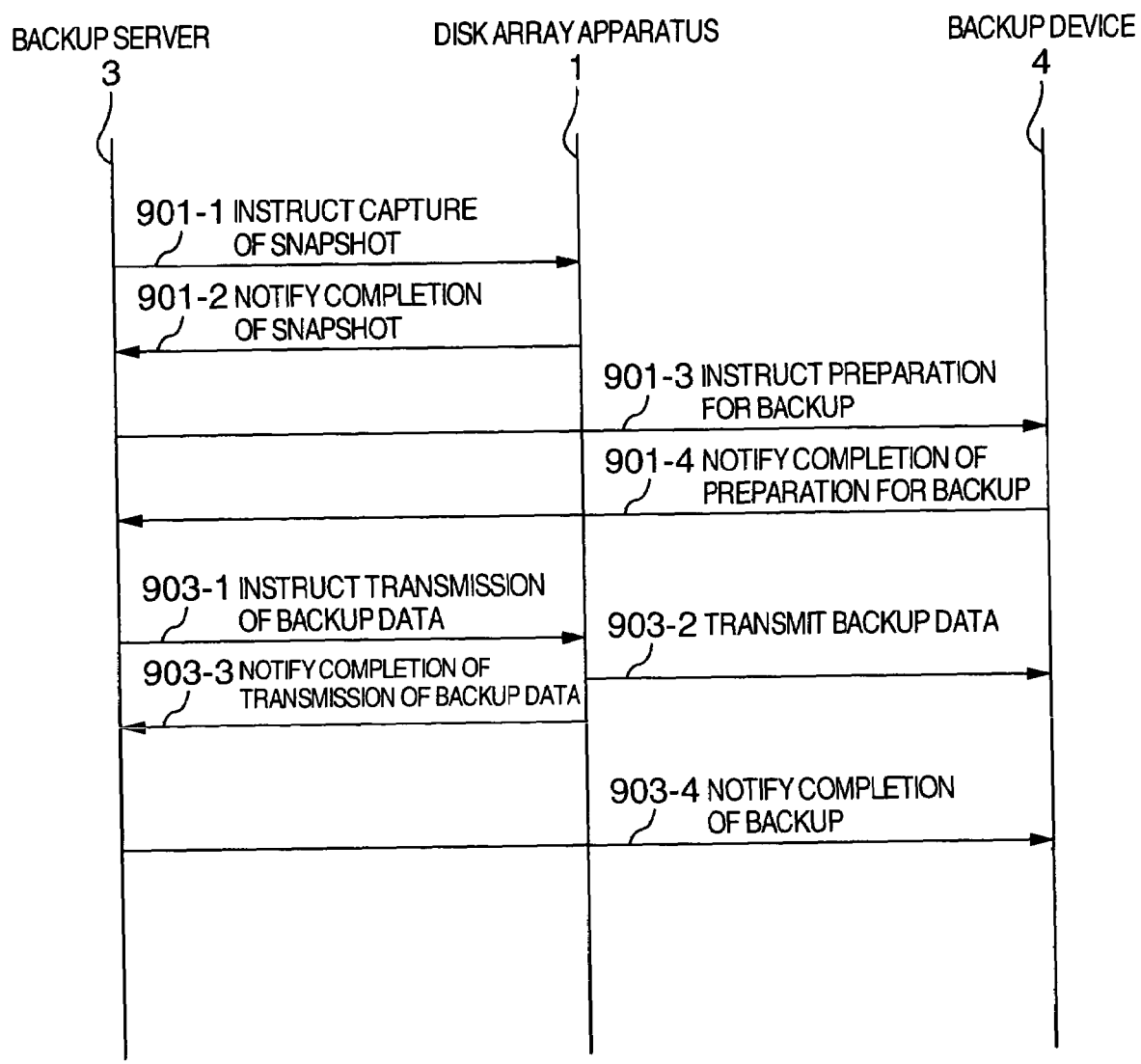
FIG. 10 is a diagram illustrating interactions among a backup server, a disk array apparatus, and a backup device for implementing steps 901, 903 in FIG. 9.

The transmission of signals shown in FIGS. 10, 11 is accomplished through the network 5 shown in FIG. 1.

Finally, a method of restoring data from backup data will be described. First, the backup server 3 issues a backup data restore instruction to the backup device 4 to restore the contents of the whole backup from the backup device 4 to the disk array apparatus 1. Next, In the order in which the update backups were acquired, update backup data is transmitted from the backup device 4 to the disk array apparatus 1 for restoration.

In this event, the backup data to be restored is read in the order of the snapshot management tables 1111-111*k* and data recorded in the updated data storage disk devices 131-13*k*. For reading the data recorded in the updated data storage disk devices 131-13*k*, the data restored from the whole backup is overwritten by the data read from the updated data storage disk devices 131-13*k* with reference to the previously read snapshot management tables.

Figure 12:
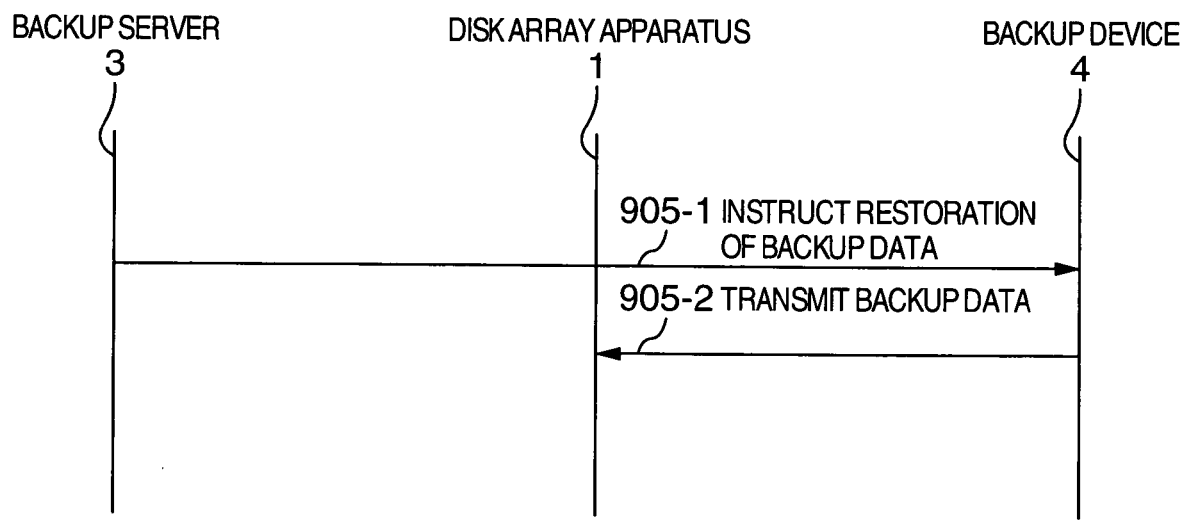
FIG. 12 is a diagram illustrating interactions involved in restoration of data from the backup device to the disk array apparatus.

FIG. 12 illustrates interactions involved in restoration of data from the backup device 4 to the disk array apparatus 1. First, the backup server 3 issues a backup data restore instruction to the disk array apparatus 1 (905-1), data in the whole backup is transmitted from the backup device 4 to the disk array apparatus 1 (905-2). By repeating this operation, data is restored from the backup device 4 to the disk array apparatus 1 as described above. The transmission of signals shown in FIG. 12 is accomplished through the network 5 shown in FIG. 1.

As described above, according to the present invention, data can be sequentially read from an area of a disk device for acquiring a backup. Since a sequential read from the disk array apparatus 1 is faster than a random read, a backup can be acquired faster than prior art methods.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A backup acquisition method for acquiring a whole or a differential backup from a disk array apparatus to a backup device, said method comprising;

receiving a snapshot capture instruction from a server to said disk array apparatus having a first disk device storing data in a plurality of blocks and a plurality of pre-update data disk devices connected to said first disk device, said disk array apparatus being connected through a network to said server and said backup device;

providing a plurality of snapshot management tables each having LBAs (logical block addresses) of said pre-update data disk devices and LBAs requested to update from said server and an index table having LBAs of said pre-update data disk devices and LBAs accessed from said server within a disk access controller of said disk array apparatus:

capturing a snapshot of the contents of said first disk into said backup device under control of a controller of said disk array apparatus in response to said snapshot capture instruction to said disk array apparatus:

sequentially recording updated data after the capture of said snapshot separately in said pre-update data disk devices of said disk array apparatus from the beginning thereof with recording an LBA for said undated data recorded in a snapshot management table for sequential recording;

instructing said disk access controller of said disk array apparatus to acquire a whole backup of said undated data at an arbitrary timing; and sequentially reading all areas of said updated data recorded in said pre-update data disk devices by referring to said LBA recorded for said sequential recording to acquire the whole backup into said backup device.

2. A backup acquisition method according to claim 1, comprising determining to instruct, if an update after a capture of said snapshot for said whole backup is for an update backup, said controller of said disk array apparatus to acquire a differential backup among said updated data at an arbitrary timing; and sequentially reading, by referring to said LBA recorded after said whole backup, a used area of disks in said disk array apparatus to acquire the differential backup into said backup device.

3. A backup acquisition method according to claim 1, wherein said update data disk devices are different from said first disk device or are defined on a disk different from said first disk device.

4. A backup acquisition method according to claim 2, wherein said update data disk devices are different from said first disk device or are defined on a disk different from said first disk device.

5. A backup acquisition method according to claim 1, wherein said arbitrary timing is a timing in accordance with a time, a number of times, or a storage capacity of acquiring of said whole backup.

6. A backup acquisition method according to claim 2, wherein said arbitrary timing is a timing in accordance with a time, a number of times, or a storage capacity of acquiring of said differential backup.

7. A backup acquisition method according to claim 2, comprising repeatedly capturing said snapshot to sequentially read, by referring to said LBA recorded after said whole backup, a used area of the disks in said disk array apparatus, thereby repeatedly acquiring a differential backup into said backup device.

8. A backup acquisition method according to claim 1, comprising:

restoring data in said disk array apparatus based on backup data including the whole backup from said backup device.

9. A backup acquisition method according to claim 2, comprising:

restoring data in said disk array apparatus based on backup data including the whole backup from said backup device.

10. A backup acquisition method according to claim 1, comprising:

acquiring an additional backup from said backup device into an external tape recording device using information of said LBAs in said plurality of snapshot management tables and said index table held in said disk array apparatus.

11. A backup acquisition method according to claim 2, comprising:

acquiring an additional backup from said backup device into an external tape recording device using information of said LBAs in said plurality of snapshot management tables and said index table held in said disk array apparatus.

12. A disk array apparatus for acquiring a whole backup or a differential backup to a backup device, comprising:

first disk device storing data in a plurality of blocks;

plurality of pre-update data disk devices connected to said first disk; and a disk access controller having a memory storing a plurality of snapshot management tables each having LBAs (logical block addresses) of said pre-update data disk devices and LBAs requested to update from a server and an index table having LBAs of said pre-update data disk devices and LBAs accessed from said server;

wherein said disk access controller comprises:

snapshot receiving means for receiving a snapshot capture instruction for capturing a snapshot of the contents of disks in said first disk device into said plurality of pre-update data disk devices from said server;

snapshot capturing means for capturing a snapshot of the contents of said first disk device into said backup device in response to said snapshot capture instruction;

updated data recording means for sequentially recording updated data after the acquisition of the snapshot separately in said pre-update data disk devices from the beginning thereof with recording an LBA for said updated data recorded in a snapshot management table for sequential recording:

updated data reading means for sequentially reading all areas of said updated data recorded in said pre-update data disk devices by referring to said LBA recorded for said sequential recording to acquire the whole backup into said backup device; and transferring means for transferring the read updated data to said backup device.

* * * * *